United States Patent [19]
Dumont

[11] Patent Number: 4,786,095
[45] Date of Patent: Nov. 22, 1988

[54] GARDENING HAND TOOL FITTED WITH A HANDLE AND VARIOUS TOOLS WHICH CAN BE INTERCHANGEABLY MOUNTED ON SAID HANDLE

[76] Inventor: Alain Dumont, 25, Rue Hoche, F-92240 Malakoff, France

[21] Appl. No.: 159,596
[22] PCT Filed: May 27, 1987
[86] PCT No.: PCT/FR87/00186
 § 371 Date: Jan. 25, 1988
 § 102(e) Date: Jan. 25, 1988
[87] PCT Pub. No.: WO87/07111
 PCT Pub. Date: Dec. 3, 1987

[30] Foreign Application Priority Data
 May 30, 1986 [FR] France .................. 86 07785

[51] Int. Cl.$^4$ .............................................. B25F 1/02
[52] U.S. Cl. .......................................... 294/51; 7/114; 56/400.04; 172/375
[58] Field of Search .................. 294/51, 52, 24, 26; 56/400.04, 400.05, 400.19; 172/375, 374, 373; 7/114, 115, 116, 167, 170

[56] References Cited
U.S. PATENT DOCUMENTS

| | | |
|---|---|---|
| 1,525,524 | 2/1925 | Wagenaar . |
| 1,886,338 | 11/1932 | Hirth . |
| 2,793,902 | 5/1957 | Govan, Jr. . |
| 4,023,221 | 5/1977 | Cadman .................. 7/114 |
| 4,068,346 | 1/1978 | Binder . |
| 4,162,132 | 7/1979 | Kress et al. ............ 172/375 |
| 4,232,422 | 11/1980 | Fellmann . |
| 4,606,089 | 8/1986 | King .......................... 294/51 |

FOREIGN PATENT DOCUMENTS

| | | |
|---|---|---|
| 622477 | 11/1935 | Fed. Rep. of Germany . |
| 716773 | 1/1942 | Fed. Rep. of Germany . |
| 792601 | 10/1935 | France . |
| 2111590 | 5/1972 | France . |
| 2285794 | 4/1976 | France . |
| 2334476 | 7/1977 | France . |
| 2361981 | 3/1978 | France . |
| 400644 | 10/1965 | Switzerland . |
| 1075610 | 7/1967 | United Kingdom . |
| 1336659 | 11/1973 | United Kingdom . |
| 1450007 | 9/1976 | United Kingdom . |

*Primary Examiner*—James B. Marbert
*Attorney, Agent, or Firm*—Gottlieb, Rackman & Reisman

[57] ABSTRACT

Each gardening tool proper (1) has a hollow mounting end-piece (3) provided on its free edge with a hook-shaped or channel-shaped member (4a,4b) whose opening is directed towards the working end of the tool. A handle (2) of either wood or plastic has a diameter at the lower end thereof which permits engagement with slight friction within the end-piece (3). A tool-retaining device stationarily fixed near the lower end of the handle has a resilient loop (11) which is intended to be engaged within the hook-shaped or channel-shaped member (4a,4a) of the end-piece. After engagement, the loop can be stretched or slackened (by means 5 and 7 to 10) in order to permit either rigid interassembly or subsequent separation of tool proper and handle.

23 Claims, 2 Drawing Sheets

GARDENING HAND TOOL FITTED WITH A HANDLE AND VARIOUS TOOLS WHICH CAN BE INTERCHANGEABLY MOUNTED ON SAID HANDLE

BACKGROUND OF THE INVENTION

1. Field of the Invention

In one form of construction which is already known, a gardening hand tool is provided with a handle or a set of handles and it is possible to use each handle with a series of different implements which are interchangeable. The handles of a set can have different lengths or widths.

2. Description of the Prior Art

In accordance with one design of the prior art, the tool proper or implement is provided with a socket of hexagonal cross-section and the socket is intended to be inserted in a coupling sleeve attached to the handle. An internally-threaded bore is pierced in the socket wall and a captive clamping screw engaged within said bore has the function of detachably fixing the handle on the tool. This mode of attachment, however, is not sufficiently reliable since the screw is liable to work loose more and more readily as the threads become worn during service. In accordance with another known practice, an end-piece which is integral with the tool proper and of rectangular cross-section is engaged in a coupling sleeve which is attached to the handle, said sleeve being provided with a recess having a corresponding cross-section. The end-piece is retained within said recess by means of a pushbutton locking device which is adapted to cooperate with an orifice pierced in the terminal face of the end-piece. All these devices are not only complex and costly to manufacture but also make it necessary to replace the handle when they no longer operate correctly.

SUMMARY OF THE INVENTION

It is a general object of the invention to provide a novel mode of construction which ensures rapid and convenient attachment in a reliable manner while further achieving low cost in comparison with known tools having detachable handles.

Accordingly, another object of the invention is to provide a gardening hand tool consisting of a handle and a number of different tools proper which can be interchangeably mounted on said handle.

A further object of the invention is to provide each tool proper with a hollow mounting end-piece fitted externally with a hook-shaped or channel-shaped member, the opening of which is directed towards the working end of the tool proper.

Yet another object of the invention is to provide a handle having dimensions at the lower end which are such as to permit engagement with slight friction within said end-piece.

Still another object of the invention is to provide a device which has the function of retaining the tool proper on the handle and which is fixed on said handle in proximity to the lower end thereof. The device under consideration is provided with an element in the form of a resilient loop and this latter is intended to be engaged within said hook-shaped or channel-shaped member which is fitted on said end-piece. Said device is also provided with means for stretching or slackening said resilient loop after the engagement aforesaid has taken place in order to ensure a rigid assembly between the handle and the tool proper or to permit separation of these latter.

The element in the form of a resilient loop can be a coil spring of sufficiently high strength or a metallic cable which is preferably sheathed.

In accordance with a particular form of construction, the means for stretching or slackening said resilient loop include a base which is intended to be fixed on the handle near the lower end of this latter, a lever pivotally mounted on the base as well as a yoke pivotally mounted on said lever by one of its ends and on the opposite end of which is mounted said loop. The lever is intended to be swung-down towards the lower end of the handle after this latter has been introduced within the end-piece in such a manner as to ensure that said base is located opposite to the aforesaid hook-shaped or channel-shaped member in order to permit engagement of said resilient loop in said member, said lever being subsequently intended to be swung-back towards the upper end of the handle until it is applied against said base in order to stretch and lock the resilient loop against the bottom of the hook or channel.

The device in accordance with the invention for attaching a handle to a tool is very simple to use, permits rapid changes of tools, ensures a rigid connection and is relatively inexpensive to produce from a mechanical standpoint. The resilient loop is the only part which is liable to suffer degradation and may consequently need to be replaced after a certain time but this small accessory is of very moderate cost.

A single handle having a diameter of 35 to 40 millimeters, for example, may prove sufficient.

This handle is preferably of wood or better still of plastic material (such as polyethylene, polypropylene, polystyrene and the like) which is preferably reinforced in order to ensure that the handle is unbreakable. Metal is not suitable for this purpose since it oxidizes and is cold to the touch. Although wood is not subject to these drawbacks, it is liable to slip between the user's hands and is sensitive to variations in temperature. Plastics are therefore preferable, especially as they are less costly than wood and make it possible at the time of molding to manufacture a handle having transverse nonslip striations having various structures which can thus be formed during the molding process and constitute further particular features of the invention as will be considered in the description given hereinafter with reference to the figures.

The advantages of the detachable handle associated with a plurality of tools proper are already known. They include small bulk and therefore a saving of storage space, ease of transport, possible storage in a box for the tools proper (the tool-box can be mounted on wheels and thus readily moved from one place to another in a garden), much more convenient grinding or sharpening of tools which are separated from their handle.

BRIEF DESCRIPTION OF THE DRAWINGS

The aforementioned objects and features of the present invention as well as other objects and advantages thereof will be more readily apparent from the following description, reference being made to the accompanying drawings in which.

DETAILED DESCRIPTION OF THE INVENTION

Figure 1:
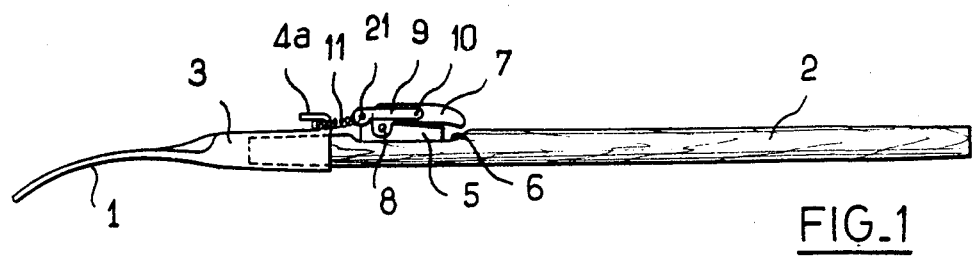
FIG. 1 is an elevational view of a first embodiment, the device for retaining the tool proper on the handle being in the closed position.
Figure 2:
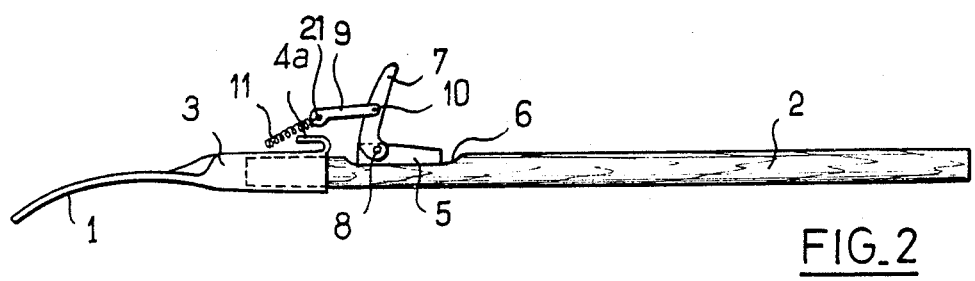
FIG. 2 is a similar view in which the retaining device is in the open position.
Figure 3:
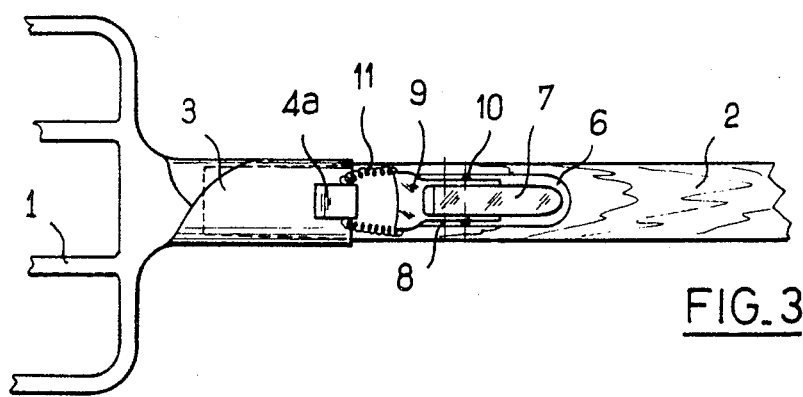
FIG. 3 is a fragmentary overhead plan view to a larger scale showing the retaining device in the closed state.
Figure 7:
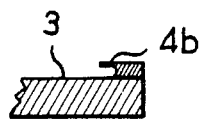
FIG. 7 is a fragmentary longitudinal sectional view of the tool socket which is provided with an alternative form of channel-shaped member.

The tool illustrated in FIGS. 1 to 3 consists of a tool 1 proper (fork, shovel, spade, rake and the like) which is mounted on a detachable handle 2 by means of a hollow end-piece 3 in which the handle is engaged. The free edge of said end-piece is adapted to carry a hook-shaped or channel-shaped member (designated by the reference 4a in FIGS. 1 to 3 and by the reference 4b in FIG. 7). The members 4a or 4b can be welded on the end-piece. The hook-shaped member 4a can also be obtained by cutting the end-piece wall and bending the cut-out portion towards the exterior of said end-piece and towards the lower end of the tool. The bottom portion of the hook-shaped or channel-shaped member can be either rectilinear or arcuate.

Provision is made for a device which is adapted to cooperate with the hook-shaped or channel-shaped member for the purpose of retaining the tool proper on the handle and which is fixed on said handle near the lower end of this latter. Said device is constituted by a base 5 which is preferably fixed within a hollowed-out portion 6 of the handle in such a manner as to ensure that it projects only to a slight extent above said handle, by a lever 7 pivotally mounted on the base at 8 in proximity to that end-face of this latter which is nearest the end-piece 3, by a yoke 9 pivotally mounted on the lever 7 at 10, and by a resilient loop 11 whose ends are attached to said yoke 9 at 21, preferably in such a manner as to be readily removable since it may prove necessary to replace this loop whenever it loses its elasticity. By way of example, said loop is formed by a cable or a coil spring. In the second case, the ends of the spring can be bent-back so as to form hooks which can readily be engaged in lateral holes 21 provided at the front end of the yoke 9. The spring can thus be readily removed and replaced.

In order to lock the tool proper 1 on the handle 2, the lever 7 is lifted and swung forward, thus making it possible to engage the coil spring 11 beneath the hook-shaped member 4a. The lever 7 is then swung-back towards the rear until it is applied against the base 5. This produces a tightening of either the coil spring 11 or the cable which may be substituted for this latter and has the effect of abuttingly retaining the lever against the bottom portion of the hook-shaped or channel-shaped member 4a (or 4b), with the result that the tool 1 and the handle 2 are rigidly assembled together. It is an advantage to ensure that, when fully lowered to the closed position shown in FIG. 1, the lever 7 projects to a slight extent both from the tool handle 2 and from the plane of the resilient loop 11. It is also preferable to ensure that the base 5 is slightly inclined towards the top end of the handle 2 since the spring is thus more effectively locked in the closed position.

As will readily be apparent, the handle 2 has been fully engaged within the end-piece 3 so as to ensure that the means (elements 5 and 7 to 11) for rigidly coupling the handle with the tool fitted on said handle are located opposite to the hook-shaped or channel-shaped member 4a or 4b. It is further apparent that the handle 2 and the tool 1 are separated by lifting and then swinging the lever 7 down towards the lower end of the tool 1, thus making it possible to release the resilient loop 11.

Figure 4:
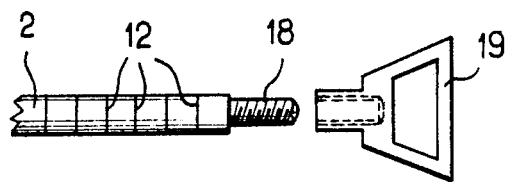
FIG. 4 is a fragmentary elevational view of the tool handle which is provided with a D-grip.
Figure 5:
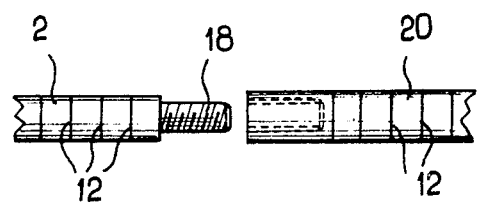
FIG. 5 is a fragmentary elevational view showing the tool handle which is provided with an extension.
Figure 6:
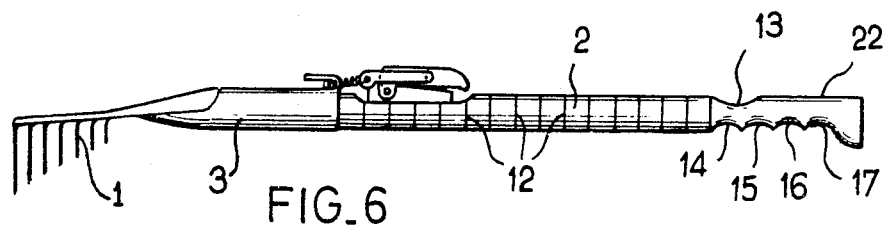
FIG. 6 is a fragmentary elevational view showing an alternative design of the end of the tool handle.

When the handle is made of molded plastic (FIGS. 4, 5 and 6), it can be formed by molding with transverse striations 12 for providing the handle with a nonslip gripping surface. A plastic handle of small length can also be produced by molding with recesses 13, 14–17 which are formed at its upper end for receiving the thumb and the other four fingers of the user's hand so as to provide a hand-grip 22. Whether the handle is of wood or plastic, its upper end can be provided with a threaded end-stud 18 for screwing the handle either into the internally-threaded socket of a D-grip 19 (as shown in FIG. 4) or into an internally-threaded portion of a handle extension 20 (as shown in FIG. 5).

When the handle is of plastic, the hollowed-out portion 6 can be formed during the molding process as may also be the case with the base 5. The lever 7 and the yoke 9 may be formed of plastic if so required.

It is preferable to use reinforced plastic for all the constituent parts of the tool which are to be made of plastic such as, for example, the handle 2 and its accessories, the D-grip 19, the handle extension 20 or else the parts 5, 7 and 9 of the device for retaining the tool proper on the handle.

Detail modifications in the field of equivalent technical means may be made in the tool described in the foregoing and in its alternative forms of construction without thereby departing either from the scope or the spirit of the invention. From this it accordingly follows that, when a cable is employed instead of the coil spring 11, the ends of the cable can be introduced in lateral bores 21 of the yoke 9 and can be joined together beneath the yoke by means of a tie.

Moreover, the cross-section of the end-piece and of the handle-end engaged within said end-piece can be either circular or rectangular. It will be apparent, however, that a rectangular cross-section facilitates correct positioning of the handle within the end-piece. So far as the hook-shaped or channel-shaped member is concerned, this member can be located at any desired level on the end-piece.

What is claimed is:

1. A gardening band tool comprising a handle and a number of different tools proper which can be interchangeably mounted on said handle as well as a device for retaining the tool proper on a handle, wherein each tool proper is provided with a hollow mounting end-piece fitted externally with a hook-shaped or channel-shaped member, the opening of which is directed towards the working end of the tool proper, wherein the lower end of the handle has dimensions such as to permit engagement thereof with slight friction within said end-piece and wherein the device for retaining the tool proper on the handle is placed directly on said handle near the lower handle-end which is engaged within said end-piece, said device being provided with an element in the form of a resilient loop to be engaged within said hook-shaped or channel-shaped member provided on said end-piece as well as means connected to said loop for stretching or slackening said resilient loop after the engagement aforesaid has taken place in order to ensure a rigid assembly between the handle and the tool proper or to permit separation of these latter.

2. A tool according to claim 1, wherein the hook-shaped or channel-shaped member is welded on the end-piece.

3. A tool according to claim 1, wherein the hook-shaped or channel-shaped member is formed by cutting the end-piece wall in the region of its free edge and bending the cut-out portion towards the exterior of said end-piece and towards the lower end of the tool.

4. A tool according to claim 1, wherein the element in the form of a resilient loop is a metallic cable.

5. A tool according to claim 1, wherein the means for stretching or slackening said resilient loop include a base located on the handle in proximity to the lower end of said handle, a lever pivotally mounted on the base as well as a yoke pivotally mounted on said lever by one of its ends and on the opposite end of which is mounted said loop, said lever being intended to be swung-down towards the lower end of the handle after said handle has been introduced within said end-piece in such a manner as to ensure that said base is located opposite to the aforesaid hook-shaped or channel-shaped member in order to permit engagement of said resilient loop in said member, said lever being subsequently intended to be swung-back towards the upper end of the handle until it is applied against said base in order to stretch and lock the resilient loop against the bottom of the hook or channel.

6. A tool according to claim 5, wherein said base is located within a hollowed-out portion of the handle.

7. A tool according to claim 1, wherein the handle is made of wood.

8. A tool according to claim 1, wherein the handle is made of plastic.

9. A tool according to claim 8, wherein the handle is provided with surface striations.

10. A tool according to claim 1 and having a short handle, wherein the handle terminates in a hand-grip provided with recesses for the five fingers of the user's hand.

11. A tool according to claim 1, wherein the handle is provided at the upper end thereof with a threaded end-stud which is capable of receiving an internally-threaded handle extension.

12. A tool according to claim 11, wherein the handle extension is of plastic and is provided with surface striations.

13. A tool according to claim 6, wherein said handle is plastic, and said hollowed-out portion is formed during molding of the handle.

14. A tool according to claim 13, wherein said base is formed by molding within the hollowed-out portion of the handle.

15. A tool according to claim 14, wherein the lever and said yoke are made of plastic.

16. A tool according to claim 8, wherein all the constituent plastic parts of said handle are made of reinforced plastic.

17. A tool according to claim 1, wherein the bottom of the hook-shaped or channel-shaped member is arcuate.

18. A tool according to claim 1, wherein the hook-shaped or channel-shaped member is located in the region of the free edge of the end-piece.

19. A tool according to claim 1, wherein the cross-section of the end-piece and of the handle-end engaged within said end-piece is rectangular.

20. A tool according to claim 1, wherein the element in the form of a resilient loop is a coil spring.

21. A tool according to claim 1, wherein the handle is provided at the upper end thereof with a threaded end-stud which is capable of receiving a D-grip.

22. A tool according to claim 1, wherein the bottom of the hook-shaped or channel-shaped member is rectilinear.

23. A tool according to claim 1, wherein the cross-section of the end-piece and of the handle-end engaged within said end-piece is circular.

* * * * *